United States Patent
Hirose et al.

(10) Patent No.: US 6,756,715 B2
(45) Date of Patent: Jun. 29, 2004

(54) SPINDLE MOTOR

(75) Inventors: Jun Hirose, Kitasaku-gun (JP); Katsutoshi Nii, Hitachi (JP); Tadayoshi Yano, Kashiwa (JP); Toshikazu Takehana, Inashiki-gun (JP); Hidekazu Tokushima, Kashiwa (JP)

(73) Assignees: Hitachi Powdered Metals, Co., Ltd., Chiba (JP); Minebea Co., Ltd., Nagano (JP)

( * ) Notice: Subject to any disclaimer, the term of this patent is extended or adjusted under 35 U.S.C. 154(b) by 0 days.

(21) Appl. No.: 10/360,000

(22) Filed: Feb. 6, 2003

(65) Prior Publication Data

US 2004/0000825 A1 Jan. 1, 2004

(30) Foreign Application Priority Data

Feb. 7, 2002 (JP) ........................................ 2002-031223

(51) Int. Cl.[7] ............................ H02K 5/12; G11B 17/02
(52) U.S. Cl. ....................... 310/90; 310/67 R; 310/90.5; 360/99.08
(58) Field of Search ................................. 310/67 R, 90, 310/90.5; 360/98.04, 98.07, 99.04, 99.08, 98.08; 384/100–115, 123, 132

(56) References Cited

U.S. PATENT DOCUMENTS

| | | | | |
|---|---|---|---|---|
| 5,822,846 A | * | 10/1998 | Moritan et al. | 29/598 |
| 5,831,355 A | * | 11/1998 | Oku | 310/42 |
| 5,914,832 A | * | 6/1999 | Teshima | 360/98.07 |
| 6,242,830 B1 | * | 6/2001 | Katagiri | 310/90 |
| 6,493,181 B1 | * | 12/2002 | Ichiyama | 360/99.08 |
| 6,574,186 B2 | * | 6/2003 | Nii et al. | 369/269 |

FOREIGN PATENT DOCUMENTS

| | | | |
|---|---|---|---|
| JP | H07-3246 | 1/1995 | 310/90 |
| JP | 07-012127 | 1/1995 | 310/90 |
| JP | H10-143988 | 5/1998 | 310/90 |
| JP | 2000-081030 | 3/2000 | 310/90 |

* cited by examiner

Primary Examiner—Tran Nguyen
(74) Attorney, Agent, or Firm—Brinks Hofer Gilson & Lione

(57) ABSTRACT

A spindle motor comprises a housing 10 including a through hole with a pair of apertures, one of the apertures being closed by a thrust plate 70 and the other aperture being open; a bearing 60 accommodated in the housing 90; a rotating shaft 30 inserted into the bearing 60; a displacement restraining structure for restraining movement of the rotating shaft 30 toward the open aperture by engaging the rotation shaft 30 with the bearing 60; a rotating member secured to the rotating shaft; and a motor generating electromagnetic function for rotating the rotating member. The through hole of the housing 90 includes a large diameter portion 92A at the thrust plate 70 side and a small diameter portion 92B at the open aperture side, and a stepped portion 93 is formed at a transition portion between the large diameter portion 92A and the small diameter portion 92B. At least a portion of the bearing 60 is located at the large diameter portion 92A side of the housing 90, and engages with the stepped portion 93 of the housing 90.

11 Claims, 6 Drawing Sheets

SPINDLE MOTOR

BACKGROUND OF THE INVENTION

1. Field of the Invention

The present invention relates to spindle motors mounted in, for example, information devices or acoustic devices which require precise rotation, and in particular, relates to spindle motors to be used in HDDs (hard disk drives) in magnetic disc units.

2. Related Art

As precise rotation motors used in, for example, HDDs, there have been provided constructions in which a disk is rotated with high precision by a brushless dynamotor. Bearings suitable for these motors comprise a combination of a radial bearing and a thrust bearing respectively supporting the radial load and thrust load of the rotating shaft as proposed in Japanese Patent Applications, First Publications Nos. 1995-12127 and 2000-81030. These bearings are generally fluid dynamic bearings in which the rotating shaft is supported with high precision due to the dynamic pressure action of a lubricant.

HDD motors mounted in personal computers require high rotation precision. In particular, HDD motors mounted in notebook personal computers require an even higher level of quietness and impact resistance, and it is also desirable to reduce the thickness thereof according to the performance requirements of the final product. Fluid dynamic bearings are able to yield high precision rotation due to the dynamic pressure action of a lubricant and are effective for quietness since the rotating shaft is supported in a non-contact manner, and they have therefore begun to be used for bearings in HDD motors. The impact resistance is ensured by positioning the rotating shaft in the axial direction so as to prevent damage to a magnetic head and a magnetic disk. Means for positioning and restraining displacement of the rotating shaft in the axial direction such as a flange formed thereto and engaging with the bearing is generally provided as in the motors disclosed in the above references. Since HDDs require that no oil leaks, there have been proposed bearings comprising a combination of a magnetic fluid and a permanent magnet.

The above construction for restraining displacement of the rotating shaft supports impact load by the bearing. When the bearing receives an impact corresponding to 1000 G, the bearing may move approximately 10 μm in the axial direction. Such a slight movement of the bearing may damage the head and the disk, and information cannot be written thereto; such a movement of the bearing must therefore be prevented.

SUMMARY OF THE INVENTION

Therefore, an object of the present invention is to provide a spindle motor which ensures sufficient levels of quietness and rotation precision.

Another object of the invention is to provide a spindle motor capable of ensuring rigid positioning of the rotating shaft in the axial direction with a simple construction while achieving extremely high impact resistance.

Another object of the invention is to provide a spindle motor allowing for a reduced thickness of the product and minimizing the number of parts.

The present invention provides a spindle motor comprising: a housing including a through hole with a pair of apertures at both ends thereof, one of the apertures being closed by a thrust plate and the other aperture being open; a bearing accommodated in the through hole of the housing; a rotating shaft inserted into the bearing, a radial load and a thrust load thereof being respectively supported by the bearing and the thrust plate; a displacement restraining structure for restraining movement of the rotating shaft toward the open aperture by engaging the rotation shaft with the bearing; a rotating member secured to the rotating shaft; and a motor generating electromagnetic function for rotating the rotating member. A lubricating fluid is provided between the bearing, and the rotating shaft and the thrust plate. The through hole of the housing includes a large diameter portion at the thrust plate side and a small diameter portion at the open aperture side, and a stepped portion is formed at a transition portion between the large diameter portion and the small diameter portion. At least a portion of the bearing is located at the large diameter portion side of the housing, and engages with the stepped portion of the housing.

According to the invention, the radial load and the thrust load of the rotating shaft are respectively supported by the bearing and the thrust plate, and a lubricating fluid is provided to the respective supporting surfaces. Therefore, the rotating shaft is supported by the bearing and thrust plate in a non-contact manner, and quietness and precise rotation are sufficiently ensured.

The rotating shaft in the invention receives a floating force from the thrust plate due to the hydraulic pressure of the lubricating fluid provided between the rotating shaft and the thrust plate. In this condition, the rotating shaft is positioned in the axial direction since the rotating shaft is restrained from moving toward the open aperture of the housing by engaging the displacement restraining structure with the bearing. The bearing is restrained from moving toward the open aperture of the housing since at least a portion of the bearing engages with the stepped portion of the housing. By the combination of these functions, rigid positioning of the rotating shaft in the axial direction is ensured, thereby achieving extremely high impact resistance. These functions and advantages are obtained by forming the stepped portion in the housing and engaging the bearing with the stepped portion. Therefore, the invention does require a large number of parts and complicated structures, thereby allowing for a reduced thickness of the product.

The displacement restraining structure in the invention may be a flange formed at the thrust plate side of the rotating shaft and may be adapted to engage with an end surface at the thrust plate side of the bearing.

The present invention includes an embodiment in which an elastic member is provided between the bearing and the thrust plate. In the embodiment, the elastic member seals the clearance between the thrust plate and the housing, and the leakage of the lubricating oil can thus be prevented.

In the embodiment having the elastic member, the displacement restraining structure may comprise a stopper ring provided between the bearing and the elastic member, and a peripheral groove which is formed on an outer surface of the rotating shaft at a location opposing the stopper ring and engages with the stopper ring. In the embodiment, the stopper ring engages with the peripheral groove, and the rotating shaft engages with the bearing via the stopper ring, whereby positioning in the axial direction is performed.

It should be noted that at least a portion of the bearing is provided at the large diameter side of the housing in the invention. The invention includes an embodiment in which a bearing is further provided at the small diameter side of the housing. The bearings in this embodiment may be an integrally formed bearing extending between the large diameter side and the small diameter side of the housing, or they may be plural bearings divided at the large diameter side and the small diameter side.

In the embodiment in which the plural bearings are separately located at the large diameter side and the small diameter side of the housing, a magnet may be provided between the bearings, and the lubricating fluid may be a magnetic fluid. According to the embodiment, the magnetic fluid is usually held in lubricating fluid paths, and the leakage of the lubricating fluid can be prevented. The location of the magnet is not limited to the above manner. The magnet may be located between a portion of the bearing located at the large diameter portion of the housing and the stepped portion of the housing.

As other embodiments which can be anticipated to have the same function as the above, the bearing may be a composite bearing installed with a magnet therein, or may be a magnetic powder mixed bearing in which a magnetic powder is dispersed. A magnetic fluid is used for the lubricating fluid in each case.

According to a preferred embodiment of the invention, the bearing has an end surface at the open aperture side of the housing, and the end surface is recessed from an edge of the open aperture of the housing. For example, when a volume increase occurs in the lubricating fluid due to temperature change, the fluid surface rises up to the end surface of the bearing at the open aperture side of the housing, and the lubricating fluid percolates therefrom. In the embodiment, the percolated fluid on the end surface of the bearing will be blocked by the inner surface of the housing, which surface is exposed to the end surface of the bearing, and the fluid will be held there as a reserve. When the volume of the fluid decreases, the fluid will return to the lubricating paths. Therefore, leakage of the lubricating fluid can be prevented and smooth circulation thereof can be maintained.

DESCRIPTION OF THE PREFERRED EMBODIMENTS

Embodiments in which the invention is applied to HDD motors will be explained with reference to the drawings hereinafter.

A first Embodiment is shown in FIG. 1 to FIG. 7.

Figure 1:
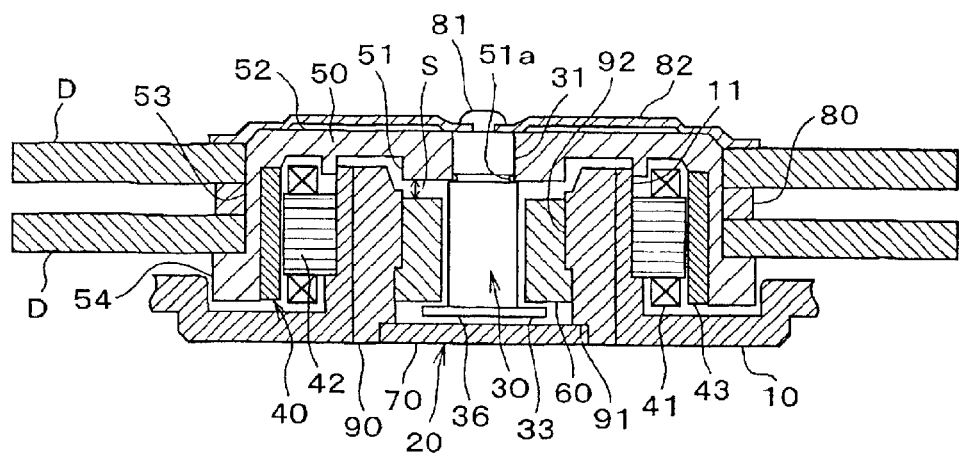
FIG. 1 is a vertical cross-sectional view of a HDD spindle motor in accordance with a first embodiment of the present invention.

FIG. 1 shows a cross section of a spindle motor. The spindle motor is adapted to rotate two magnetic disks D, and comprises a case 10, a bearing unit 20, a rotating shaft 30, a motor 40, and a hub 50 for supporting the magnetic disk D. A cylindrical holder 11 protruding upwardly in FIG. 1 is formed at the center of the case 10, and the bearing unit 20 is accommodated therein.

Figure 2:
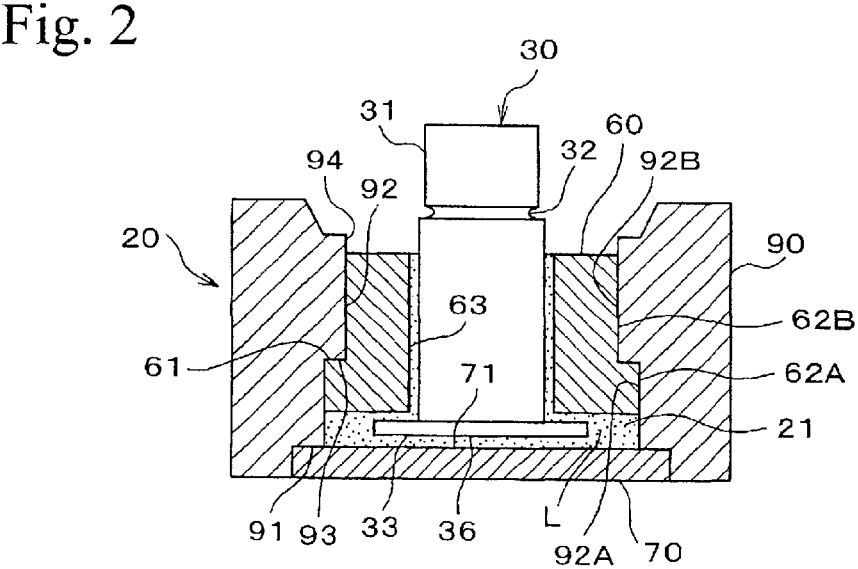
FIG. 2 is a vertical cross-sectional view of the bearing unit in accordance with the first embodiment.

As shown in FIG. 2, the bearing unit 20 consists of a cylindrical housing 90 formed with a through hole 92 at the axial center thereof, a disk-shaped thrust plate 70 which closes the lower aperture of the housing 90, and a cylindrical bearing 60 accommodated in the housing 90. The thrust plate 70 is fitted into a peripheral recess 91 formed at the inner edge of the lower side of the housing 90, and is secured thereto by a means such as caulking, welding, adhering, or the like. The bearing 60 is press fitted into the through hole 92 of the housing 90, or is secured to the housing 90 by means such as welding or adhering in a fitted condition thereinto. The bearing unit 20 is secured in the holder 11 of the casing 10 in the same manner as the bearing is secured in the housing 90.

The rotating shaft 30 is rotatably supported by the bearing unit 20. More specifically, the rotating shaft 30 is inserted into the bearing 60, and the lower end surface 36 thereof is supported by the thrust plate 70. In this condition, the radial load and the thrust load of the rotating shaft 30 are respectively supported by the bearing 60 and thrust plate 70.

As shown in FIG. 1, the rotating shaft 30 upwardly projects from the bearing 60, and the projected end thereof is formed with a hub fastener 31 to which a hub 50 is secured. The hub 50 has an approximately hat-shaped cross section, and consists of a disk portion 52 formed with a boss 51 projecting inward at its center, a cylinder 53 extending downwardly from the circumference of the disk portion 52, and a flange 54 projecting outwardly from the circumference of the cylinder 53. The hub fastener 31 of the rotating shaft 30 is inserted and fitted into the hollow portion of the boss 51. An annular protrusion 51a is formed on the inner surface of the lower end of the boss 51. The protrusion 51a is fitted into a groove 32 formed on the outer surface of the rotating shaft 30 (see FIG. 2), whereby the hub 50 is secured to the rotating shaft 30. It should be noted that the protrusion 51a may be fitted into the groove 32 by press fitting the rotating shaft 30 into the hollow portion of the hub 50. The hub 50 may be made from an elastic synthetic resin such as a plastic, and is elastically deformed outwardly by the rotating shaft 30 in the press fitting. With this mode of fastening, the inner peripheral surface of the cylinder 53 of the hub 50 and the outer peripheral surface of the holder 11 of the case 10 oppose each other. A motor stator 42 wound with a coil 41 is secured to one of opposing surfaces at the casing 10 side, and a motor magnet 43 is secured to the other surface at the hub 50 side. These motor stator 42 and motor magnet 43 construct the motor 40.

A pair of magnetic disks D holds ring-shaped spacer 80 therebetween, and magnetic disks D are fitted to the outer surface of the cylinder 53 of the hub 50. These disks D are held between a damper 81 which is secured to the upper end surface of the rotating shaft 30 and the flange 54 and are supported by the hub 50.

The above is the overall construction of the spindle motor in the first embodiment. In this motor, when a specified electric current is supplied to the coil 41 and an electromagnetic field is generated from the motor stator 42, the hub 50 rotates around the rotating shaft 30 due to the electromagnetic interaction generated between the electromagnetic field and the motor magnet 43; thus, the hub 50 causes magnetic disks D to rotate.

The construction of the bearing unit 20 and the rotating shaft 30 will be described in detail hereinafter.

As shown in FIG. 2, an annular stepped portion 93 which faces downward (the thrust plate 70 side) is formed in the through hole 92 of the housing 90 at the intermediate portion thereof in the axial direction. The stepped portion 93 divides the through hole 92 into a large diameter portion 92A at the lower side and a small diameter portion 92B at the upper side (open aperture side of the housing 90). The stepped portion 93 is a planar surface perpendicular to the axial direction and has a constant width.

Figure 3:
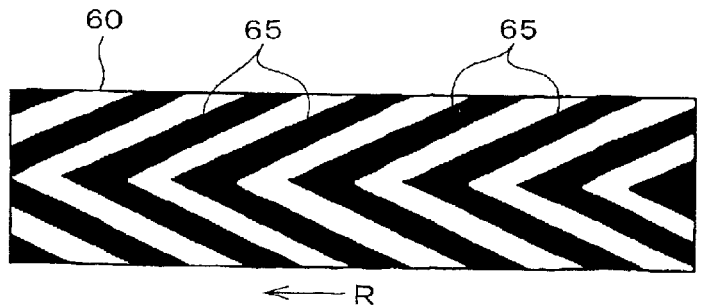
FIG. 3 is an expanded view of the inner peripheral surface of the bearing formed with dynamic pressure generating grooves.

As shown in FIG. 2, an annular stepped portion 61 which faces upward is formed on the outer surface of the bearing 60 at the intermediate portion thereof in the axial direction. The stepped portion 61 divides the bearing 60 into a large diameter portion 62A at the lower side and a small diameter portion 62B at the upper side. The stepped portion 61 is a planar surface perpendicular to the axial direction as well as the stepped portion 93 of the housing 90, and has approximately the same width as that of the stepped portion 93. Over the entire inner surface of the bearing 60 is a bearing surface 63 which supports the radial load of the rotating shaft 30. As shown in FIG. 3, herringbone grooves 65 comprised of multiple V-shaped grooves for generating radial dynamic pressure is formed in the bearing surface 63. The herringbone grooves 65 are formed parallel to each other at a constant distance and the intersecting portions thereof converge toward the rotational direction R of the rotating shaft 30.

As shown in FIG. 2, a flange 33 is integrally formed at the lower end of the rotating shaft 30. The diameter of the flange 33 is larger than the inner diameter of the bearing 60 so as to engage with the lower end surface of the bearing 60, thereby restraining upward movement of the rotating shaft 30 and displacement thereof. It should be noted that the flange 33 may be formed separately from the rotating shaft 30. In this mode, a ring-shaped member is secured to the lower surface of the rotating shaft 30 so as to formed the flange 33.

Figure 4:
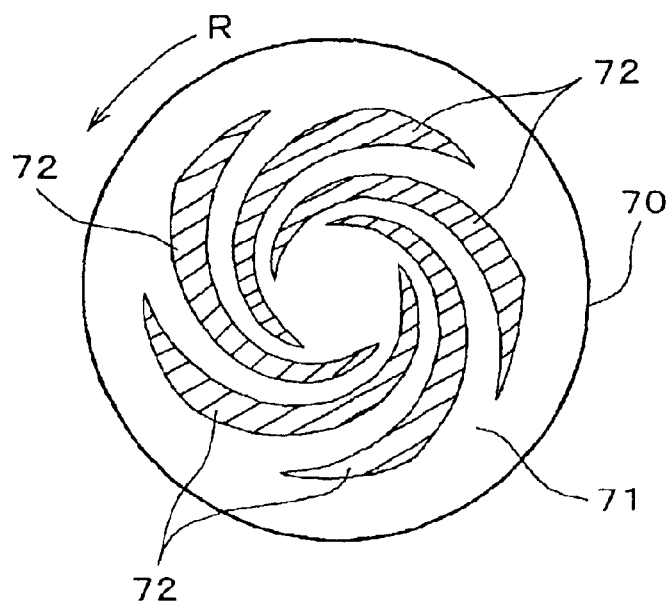
FIG. 4 is a plan view of the thrust bearing surface formed with dynamic pressure generating grooves.

The thrust plate 70 supports the lower surface 36 of the rotating shaft 30 including the flange 33 by a thrust bearing surface 71 at the center of the upper surface, and supports the thrust load of the rotating shaft 30. As shown in FIG. 4, plural spiral grooves 72 for generating thrust dynamic pressure are formed on the thrust bearing surface 71. The spiral grooves 72 are formed so as to converge toward the center of the thrust bearing surface 71, which is the center of the lower surface of the rotating shaft 30, while curving along the rotational direction R of the rotating shaft 30. The grooves for generating thrust dynamic pressure may also be herringbone grooves as well as the bearing surface 63 of the bearing 60.

The bearing unit 20 and the rotating shaft 30 are assembled in the following manner. The small diameter portion 62B of the bearing 60 is inserted into the through hole 92 of the housing 90 via the large diameter portion 92A and then the stepped portion 61 is brought into contact with the stepped portion 93 of the housing 90. If the bearing 60 is press fitted into the housing 90, the setting is accomplished merely by the press fitting. If the bearing 60 is loosely fitted into the housing 90, these members may be secured to each other by welding or adhering. Then, the hub fastener 31 of the rotating shaft 30 is inserted into the hollow portion of the bearing 60 via the large diameter portion 62A, and the thrust plate 70 is then fitted into the recess 91 of the housing 90 and is secured thereto.

In the mode of setting, the outer surfaces of the large diameter portion 62A and the small diameter portion 62B of the bearing 60 closely contact the inner surfaces of the large diameter portion 92A and the small diameter portion 92B of the hosing 90. A small gap is formed between the bearing surface 63 of the bearing 60 and the rotating shaft 30, and the gap is supplied with a lubricant L. A gap is formed between the lower end surface of the bearing 60 and the thrust plate 70, and this gap is employed as an oil reservoir 21. The flange 33 of the rotating shaft 30 is located in the oil reservoir 21. The thickness of the flange 33 is set such that a small gap is formed between the flange 33, the bearing 60 and the thrust plate 70, and the lubricant L is supplied to the gap. The upper end surface of the bearing 60 is lower than the open edge of the housing 90, whereby the upper end of the inner surface of the housing 90 (portion denoted by reference numeral 94 in FIG. 2) is exposed. The bearing unit 20 is secured to the holder 11 of the case 10 by press fitting, welding or adhering as mentioned above.

Various suitable materials may be used for the bearing unit 20 (housing 90, bearing 60 and thrust plate 70) and the rotating shaft 30, for example, various stainless steels and various copper alloys (such as bronze or brass), and porous sintered alloys may be used for bearing unit 20. When the bearing 60 and the thrust plate 70 are made of copper alloy, the above described herringbone grooves 65 and spiral grooves 72 can be formed by chemical etching, electrolytic etching or by coining. In the case of a sintered alloy, the grooves 65 and 72 can be formed by press forming a green compact or sizing a sintered compact.

The interaction of the rotating shaft 30 and the bearing unit 20 supporting the shaft will be explained hereinafter. When the rotating shaft 30 rotates by the action of the motor 40, lubricant L from the oil reservoir 21 enters into the gap between the thrust bearing surface 71 of the thrust plate 70 and the lower end surface of the rotating shaft 30, between the upper surface of the flange 33 and the lower surface of the bearing 60, and between the bearing surface 63 of the bearing and the outer surface of the rotating shaft 30, and forms an oil film. In the bearing 60, dynamic pressure is generated when lubricant L is supplied to the herringbone grooves 65 formed on the bearing surface 63. In the thrust bearing 70, dynamic pressure is generated when lubricant L is supplied to the spiral grooves 72. Thus, high levels of precision rotation and quietness can be obtained since the rotating shaft 30 is supported by the bearing 60 in a non-contact manner. Furthermore, the rotating shaft 30 is supported with high rigidity and further high precision rotation can be obtained since the rotating shaft 30 is supported by the dynamic pressure generated as in the above in radial and thrust directions.

Although the rotating shaft 30 receives a floating force from the thrust plate 70 by the dynamic pressure generated therebetween, the upward movement of the rotating shaft 30 is restrained since the flange 33 engages with the bearing 60, and the rotating shaft 30 is positioned in the axial direction. The bearing 60 with which the rotating shaft 30 engages via the flange 33 is restrained from moving upwardly by engagement of the stepped portion 61 with the stepped portion 93 of the housing 90. Therefore, the rotating shaft 30 is positioned reliably and rigidly, and superior impact resistance can be obtained. Such interactions are reliable by forming the stepped portion 93 in the housing and forming the stepped portion 61 engaging with the stepped portion 93 in the bearing 60. Therefore, the spindle motor does not require additional parts and complicated constructions, and can be used to reduce the thickness of products.

Figure 5:
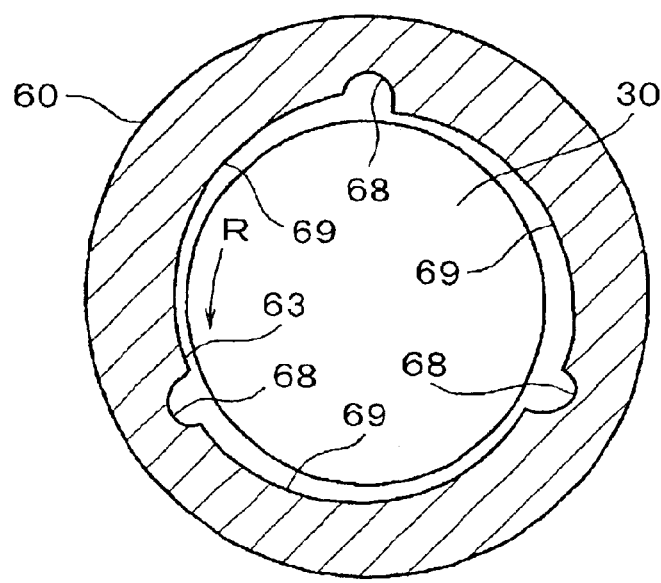
FIG. 5 is a horizontal cross-sectional view of the inner peripheral surface of the bearing formed with dynamic pressure generating grooves.

Although the preferred embodiment is described as having herringbone grooves 65 for generating dynamic pressure formed on the bearing surface 63 of the bearing 60, the grooves for generating dynamic pressure can also be the form in FIG. 5. In FIG. 5, plural oil reservoir grooves 68 are formed at equal peripheral intervals extending in the axial direction on the bearing surface 63. Wedge-shaped grooves 69 are formed between the oil reservoir grooves 68 with smaller clearance in the rotational direction R of the rotating shaft 30.

Herringbone grooves, for example, shown in FIG. 3 can be formed on the lower surface of the flange 33 instead of forming grooves for generating thrust dynamic pressure on the thrust plate 70. Similar herringbone grooves can be formed on the upper surface of the flange 33. In this mode, dynamic pressure is generated between the flange 33 and the lower surface of the bearing 60, whereby the dynamic pressure biases downwardly the rotating shaft 30 and the rotating shaft 30 is reliably positioned in the axial direction.

In the preferred embodiment, the upper surface of the bearing 60 is recessed from the edge of the open aperture of the housing 90. Therefore, when the lubricant L percolates to the upper surface of the bearing 60, the lubricant L is blocked by the upper inner surface 94 of the housing 90, and the lubricant L is held there as a reserve. Such percolation of the lubricant L occurs due to rising up of the lubricant surface by volume increase of the lubricant L due to temperature change, and the lubricant L therefore returns to the bearing surface 63 when the volume of the lubricant L decreases. Therefore, leakage of the lubricant L can be prevented and smooth circulation thereof can be maintained. It should be noted that the gap S (see FIG. 1) between the upper surface of the bearing 60 and the lower surface of the hub 50 should be sufficient so as not to fill the gap with the percolated lubricant L, which will rise up by capillary action and will scatter by centrifugal force.

Modifications of the bearing 60 and the housing 90 of the first embodiment will be explained with reference to FIGS. 6 and 7.

Figure 6:
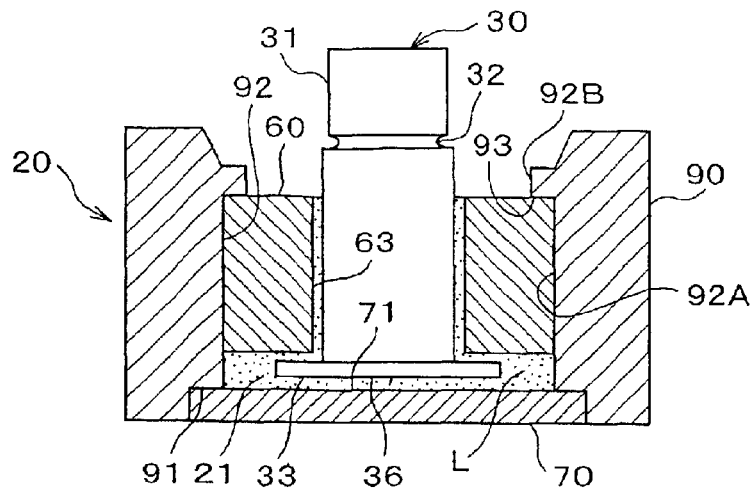
FIG. 6 is a vertical cross-sectional view of the bearing unit in accordance with a modification of the first embodiment.

The bearing 60 in FIG. 6 is a simple cylinder with no stepped portion 61 on the outer surface thereof. The upper end surface of the bearing 60 engages with the stepped portion 93 of the housing 90 and the outer surface thereof closely contacts with the inner surface of the small diameter portion 92B of the housing 90. In this mode, the stepped portion 93 of the housing 90 is therefore formed at a position above that in FIG. 2.

Figure 7:
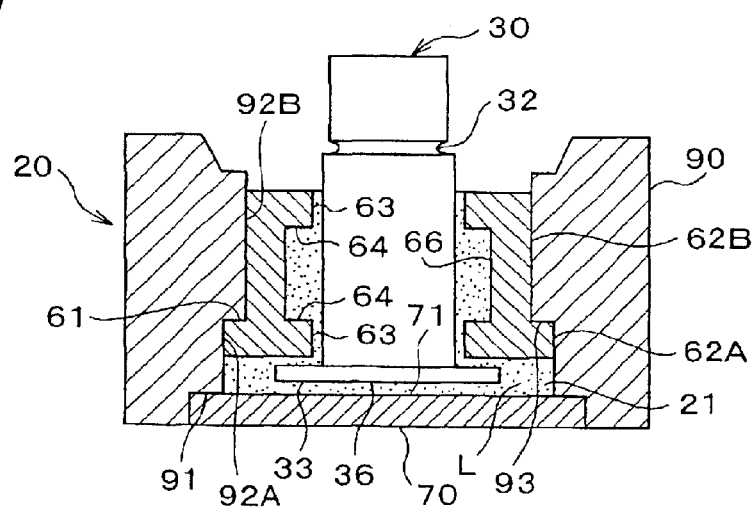
FIG. 7 is a vertical cross-sectional view of the bearing unit in accordance with another modification of the first embodiment.

The bearing 60 in FIG. 7 has peripheral protrusions 64 at both axial ends of the inner surface. The inner surface of the peripheral protrusion 64 is employed as the bearing surface 63 and the intermediate portion of the peripheral protrusions 64 is recessed portion 66 which does not contact the rotating shaft 30. The large diameter portion 62A on the outer surface of the bearing 60 corresponds to the lower peripheral protrusion 64, and these portion 62A and 64 have the same width in the axial direction. The bearing 60 has a stepped portion 61 which engages with the stepped portion 93 of the housing 90. In the bearing 60 in FIG. 7, the rotating shaft 30 is supported at two portions by the bearing surfaces 63 of the peripheral protrusions 64, and rotating shaft 30 is therefore rigidly supported and the recessed portion 66 is employed as an oil reservoir to improve lubricating performance.

Second through fifth embodiments according to the invention will be described hereinafter. These embodiments are modifications of the bearing unit 20 and the rotating shaft 30, and numbers corresponding to those in FIGS. 1 to 7 are attached to the same elements as in the first embodiment, and explanations thereof are omitted.

Figure 8:
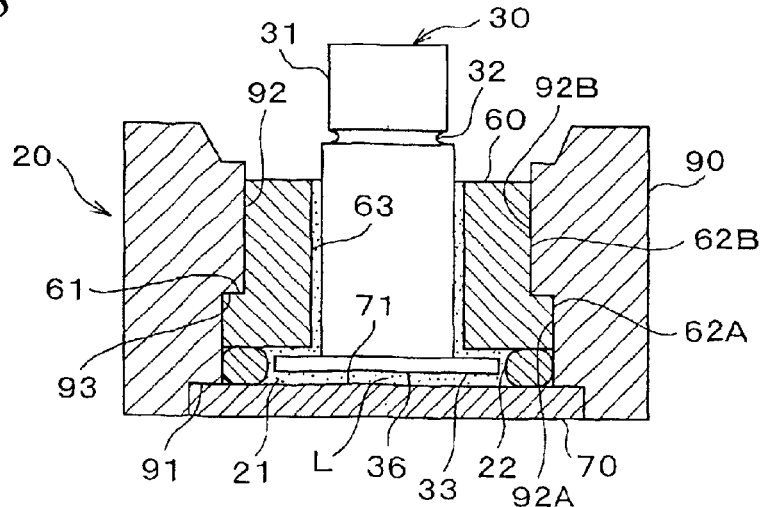
FIG. 8 is a vertical cross-sectional view of the bearing unit in accordance with the second embodiment of the invention.

The second embodiment is shown in FIG. 8. The bearing unit 20 in the second embodiment is essentially the same as that in FIG. 2, and it is characterized in comprising elastic ring 22 made from rubber and resin held between the bearing 60 and the thrust plate 70 in a compressed condition. The elastic ring 22 closely contacts the inner surface of the large diameter portion 92A of the housing 90. In this construction, the clearance between the thrust plate 70 and the housing 90 is sealed, and leakage of lubricant L is restrained.

Figure 9:
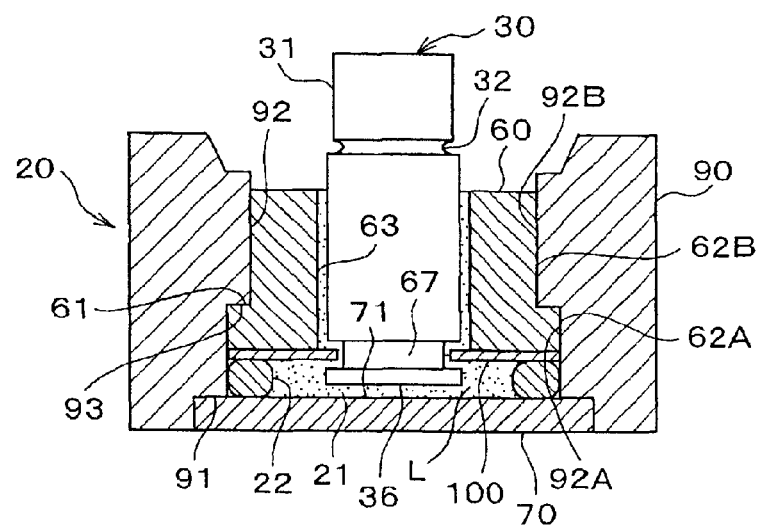
FIG. 9 is a vertical cross-sectional view of the bearing unit in accordance with the third embodiment of the invention.
Figure 10:
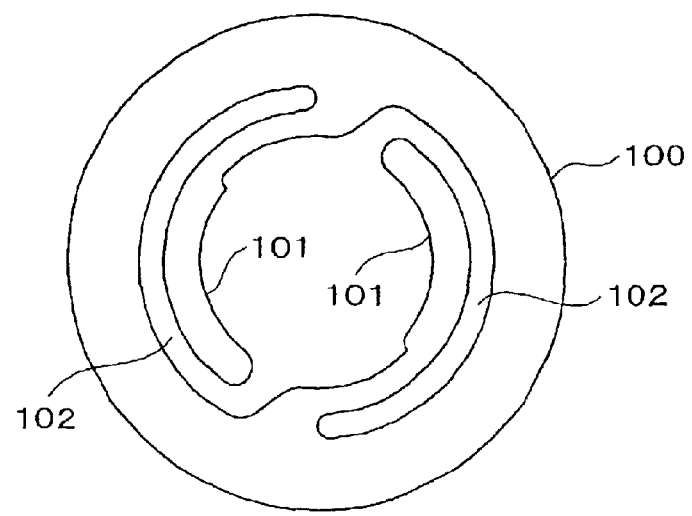
FIG. 10 is a plan view of a stopper ring according to the third embodiment of the invention.

The third embodiment is shown in FIGS. 9 and 10. The third embodiment comprises the elastic ring 22 between the bearing 60 and the thrust plate 70 as well as the second embodiment, and is characterized in comprising a washer-shaped stopper ring 100 held between the bearing 60 and the elastic ring 22. The rotating shaft 30 does not have the flange 33 such as in the previous embodiment, but has a peripheral groove 67 at a lower peripheral position corresponding to the stopper ring 100.

As shown in FIG. 10, stopper ring 100 has a pair of arched elastic pieces 101 which are partially separated from the inner surface of the ring 100 by slits 102. The elastic piece 101 can be elastically deformed in the axial and radial direction. When the rotation shaft 30 is inserted into the bearing 20 and the stopper ring 100, the elastic pieces 101 are elastically deformed in the axial and radial direction, and are then inserted into the peripheral groove 67 of the rotating shaft 30. In this condition, the peripheral groove 67 engages with the stopper ring 100, and the rotating shaft 30 engages with the bearing 60 via the stopper ring 100. It should be noted that the stopper ring 100 does not contact the rotating shaft 30, and the rotation of the rotating shaft 30 is not disturbed. In this embodiment, the peripheral groove 67 and the stopper ring 100 consist of a displacement restraining structure, which axially positions the rotating shaft 30.

In the third embodiment, modification of the spacing between the stopper ring 100 and the thrust plate 70 is compensated for by the deformation of the elastic ring 22, and the stepped portion 61 of the bearing 60 reliably engages with the stepped portion of the housing 90.

Figure 11:
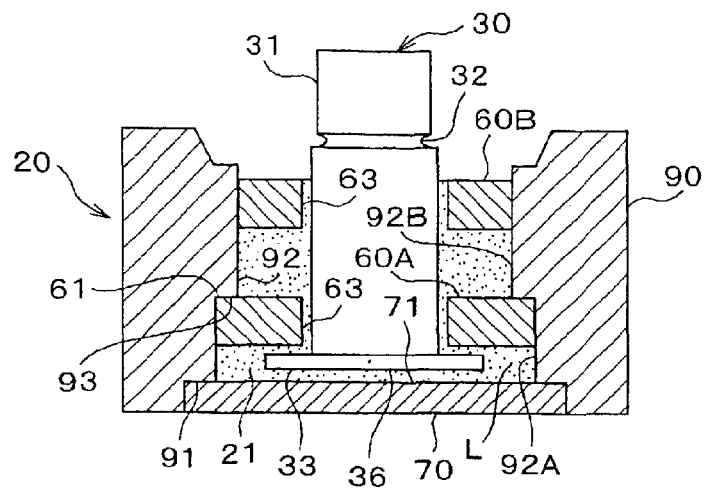
FIG. 11 is a vertical cross-sectional view of the bearing unit in accordance with the fourth embodiment of the invention.

The fourth embodiment is shown in FIG. 11. In the fourth embodiment, the bearing is divided into a first bearing 60A and a second bearing 60B. The first bearing 60A is located at the large diameter portion 92A, the second bearing 60B is located at the small diameter portion 92B of the housing 90, and these bearings 60A and 60B closely contact the inner surface of the housing 90. The inner diameters of the bearings 60A and 60B are identical to each other, and the inner surfaces thereof are employed as bearing surfaces 63. The first bearing 60A engages with the stepped portion 93 of the housing 90. The second bearing 60B is located at the upper end portion of the housing 90 apart from the first bearing 60A. In the fourth embodiment, the rotating shaft 30 is supported at two portions by the separated two bearings 60A and 60B as well as the bearing 60 shown in FIG. 7, and rotating shaft 30 is therefore rigidly supported and the intermediate portion therebetween is employed as an oil reservoir to improve lubricating performance.

The fifth embodiment is shown in FIGS. 12 to 15. The fifth embodiment is characterized in that a magnet is located in the bearing and a magnetic fluid is used as a lubricant.

The bearing unit 20 in FIG. 20 is essentially the same as that in FIG. 11, and is characterized in that an annular magnet 110 is located between the first bearing 60A and the second bearing 60B. The magnet 110 is secured to the large diameter portion 92A of the housing 90 by means such as press fitting, and is held between the bearings 60A and 60B.

Figure 13:
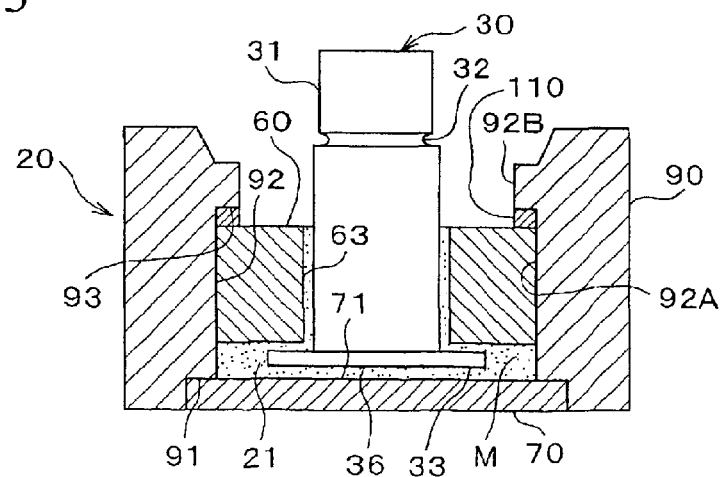
FIG. 13 is a vertical cross-sectional view of the bearing unit in accordance with a modification of the fifth embodiment of the invention.

The bearing unit 20 in FIG. 13 is essentially the same as that in FIG. 6, and is characterized in that an annular magnet 110 is located between the bearing 60 and the stepped portion 93 of the housing 90.

Figure 14:
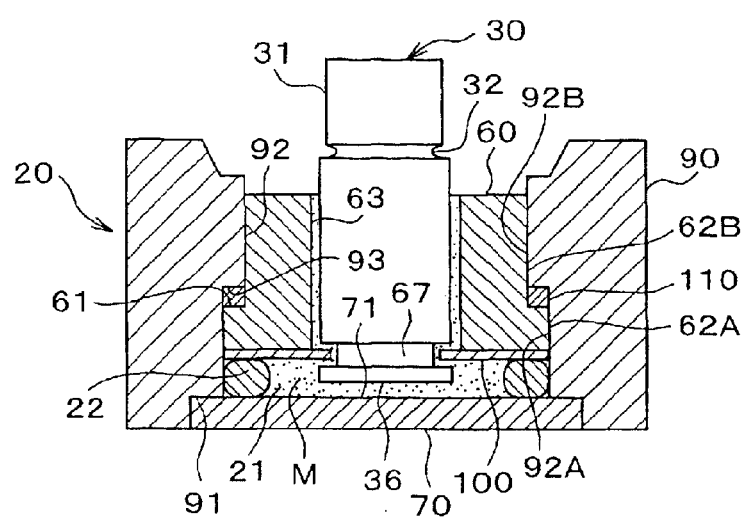
FIG. 14 is a vertical cross-sectional view of the bearing unit in accordance with another modification of the fifth embodiment of the invention.

The bearing unit 20 in FIG. 14 is essentially the same as that in FIG. 9, and is characterized in that an annular magnet 110 is located between the stepped portion 61 of the bearing 60 and the stepped portion 93 of the housing 90.

Figure 15:
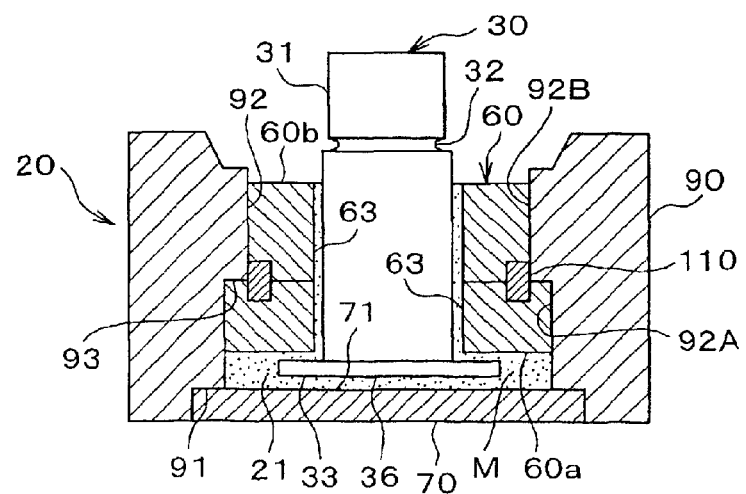
FIG. 15 is a vertical cross-sectional view of the bearing unit in accordance with another modification of the fifth embodiment of the invention.

The bearing 60 of the bearing unit 20 in FIG. 15 has a construction in which the bearing 60 in FIG. 2 is divided into upper and lower portions. The divided magnets 60a and 60b hold the annular magnet 110 and closely contact with each other. The magnet 110 is fitted to the upper end surface of the lower bearing 60a and the outer surface of the lower end of the upper bearing 60b, and a composite bearing with the magnet 110 is thus constructed.

In the bearing units shown in FIGS. 12 to 15, a magnetic fluid M in which ferromagnetic particles are dispersed in a lubricant is used instead of the lubricant L. According to the embodiment in which the magnet 110 is located in the bearing and the magnetic fluid M is used for the lubricant, the magnetic fluid M is usually held in the lubricating path, so that leakage of the magnetic fluid M is restrained and good lubricating performance is maintained over a long period. Such advantages may be obtained by using a sintered bearing mixed with a magnetic powder instead of locating or installing the magnet 110 in the bearing.

Figure 12:
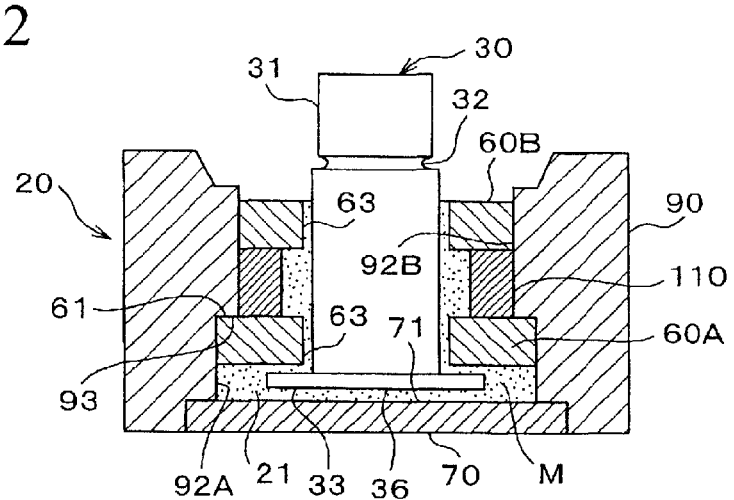
FIG. 12 is a vertical cross-sectional view of the bearing unit in accordance with the fifth embodiment of the invention.

Although the flange 33 of the rotating shaft 30 is employed as the displacement restraining structure for the rotating shaft 30 in the bearing units in FIGS. 11 to 13, instead of such structures, the stopper ring 100 may be used for the displacement restraining structure as shown in FIG. 9. The flange 33 for the displacement restraining structure may be applied to the bearing unit 20 in FIG. 14. The displacement restraining structure for the rotating shaft 30 is not limited to the above structures, and other types of structures may be applied.

What is claimed is:

1. A spindle motor comprising:
   a housing including a through hole with a pair of apertures at both ends thereof, one of the apertures being closed by a thrust plate and the other aperture being open;
   a bearing accommodated in the through hole of the housing;
   a rotating shaft inserted into the bearing, a radial load and a thrust load thereof being respectively supported by the bearing and the thrust plate;
   a displacement restraining structure for restraining movement of the rotating shaft toward the open aperture by engaging the rotation shaft with the bearing;
   a rotating member secured to the rotating shaft; and
   a motor generating electromagnetic function for rotating the rotating member;
   wherein a lubricating fluid is provided between the bearing, and the rotating shaft and the thrust plate;
   the through hole of the housing includes a large diameter portion at the thrust plate side and a small diameter portion at the open aperture side, and a stepped portion is formed at a transition portion between the large diameter portion and the small diameter portion; and
   at least a portion of the bearing is located at the large diameter portion side of the housing, and engages with the stepped portion of the housing.

2. The spindle motor according to claim 1, wherein the displacement restraining structure is a flange formed at a thrust plate side of the rotating shaft and is for engaging with an end surface at a thrust plate side of the bearing.

3. The spindle motor according to claim 1, wherein an elastic member is provided between the bearing and the thrust plate.

4. The spindle motor according to claim 3, wherein the displacement restraining structure comprises a stopper ring provided between the bearing and the elastic member, and a peripheral groove which is formed on an outer surface of the rotating shaft at a location opposing the stopper ring and engages with the stopper ring.

5. The spindle motor according to claim 4, wherein the stopper ring has an inner portion which can elastically deform in axial and radial directions so as to allow the rotating shaft to pass therethrough.

6. The spindle motor according to claim 1, wherein a bearing is further provided at the small diameter side of the housing.

7. The spindle motor according to claim 6, wherein a magnet is provided between the bearings provided at the small diameter side and the large diameter side of the housing, and the lubricating fluid is a magnetic fluid.

8. The spindle motor according to claim 1, wherein the bearing is provided at the large diameter side of the housing, a magnet is provided between the bearing and the stepped portion, and the lubricating fluid is a magnetic fluid.

9. The spindle motor according to claim 1, wherein the bearing is a composite bearing installed with a magnet therein, and the lubricating fluid is a magnetic fluid.

10. The spindle motor according to claim 1, wherein the bearing is a magnetic powder mixed bearing in which a magnetic powder is dispersed, and the lubricating fluid is a magnetic fluid.

11. The spindle motor according to claim 1, wherein the bearing has an end surface at the open aperture side of the housing, and the end surface is recessed from an edge of the open aperture of the housing.

* * * * *